(12) United States Patent
Castellano et al.

(10) Patent No.: US 7,668,108 B2
(45) Date of Patent: *Feb. 23, 2010

(54) PERFORMANCE INDICATOR FOR A HIGH-SPEED COMMUNICATION SYSTEM

(75) Inventors: Andrew J. Castellano, Laguna Beach, CA (US); Gary S. Huff, Irvine, CA (US)

(73) Assignee: Broadcom Corporation

( * ) Notice: Subject to any disclaimer, the term of this patent is extended or adjusted under 35 U.S.C. 154(b) by 262 days.

This patent is subject to a terminal disclaimer.

(21) Appl. No.: 11/332,937

(22) Filed: Jan. 17, 2006

(65) Prior Publication Data

US 2006/0114833 A1     Jun. 1, 2006

Related U.S. Application Data

(63) Continuation of application No. 09/841,588, filed on Apr. 23, 2001, now Pat. No. 6,987,737.

(60) Provisional application No. 60/198,836, filed on Apr. 21, 2000.

(51) Int. Cl.
    *H04J 1/16*     (2006.01)
(52) U.S. Cl. ...................... 370/248; 370/252
(58) Field of Classification Search .............. 370/248, 370/252
    See application file for complete search history.

(56) References Cited

U.S. PATENT DOCUMENTS

| | | | |
|---|---|---|---|
| 4,918,708 A | 4/1990 | Pottinger et al. | |
| 5,381,414 A * | 1/1995 | Gibson | 370/311 |
| 5,608,729 A * | 3/1997 | Orsic | 370/445 |
| 5,640,684 A | 6/1997 | Konosu et al. | |
| 5,737,365 A | 4/1998 | Gilbert et al. | |
| 5,790,806 A * | 8/1998 | Koperda | 709/252 |
| 5,884,041 A * | 3/1999 | Hurwitz | 709/228 |
| 6,026,494 A | 2/2000 | Foster | |
| 6,046,550 A | 4/2000 | Ference et al. | |
| 6,141,350 A | 10/2000 | Mahale et al. | |
| 6,148,002 A * | 11/2000 | Patel et al. | 370/438 |
| 6,198,727 B1 | 3/2001 | Wakeley et al. | |
| 6,457,055 B1 | 9/2002 | Hwong et al. | |
| 6,459,700 B1 | 10/2002 | Hoang | |
| 6,603,741 B1 | 8/2003 | Poulter et al. | |
| 6,684,347 B1 | 1/2004 | Coffey | |
| 6,700,898 B1 | 3/2004 | Barakat et al. | |
| 6,925,054 B1 * | 8/2005 | Atterton et al. | 370/218 |
| 2002/0046267 A1 * | 4/2002 | Andra et al. | 709/220 |

* cited by examiner

*Primary Examiner*—Andrew Lee
(74) *Attorney, Agent, or Firm*—McAndrews, Held & Malloy, Ltd.

(57) ABSTRACT

A method and apparatus for generating a performance indicator in a high-speed communication system. A plurality of disparate communication status signals with differing formats from a transceiver are combined in a logic module to create a single link quality indicator signal. The link quality indicator signal is used to encode different operational states of the transceiver from fully operational, to marginally operational, to failed. The link quality indicator signal is advantageously employed to drive a LED creating a visual performance indicator.

9 Claims, 3 Drawing Sheets

PERFORMANCE INDICATOR FOR A HIGH-SPEED COMMUNICATION SYSTEM

CROSS-REFERENCE TO RELATED APPLICATION(S)

This patent application is a continuation of U.S. patent application Ser. No. 09/841,588, filed Apr. 23, 2001 now U.S. Pat. No. 6,987,737, which claims the priority of U.S. Provisional Patent Application No. 60/198,836, filed Apr. 21, 2000, which is incorporated herein by reference.

BACKGROUND OF THE INVENTION

This invention relates generally to networked systems and more specifically to performance indicators in a high-speed communication system.

High-speed network devices within high-speed communication systems may employ disparate communication modules with each communication module handling a separate function for the high-speed communications device. Each communication module may generate a variety of status signals related to the communication module's internal processes. These status signals may relate to the quality of the communication link established by the high-speed communications device. For example, a communication module may have an internal process for handling an auto-negotiation process, such as the auto-negotiation process defined in the well known IEEE 802.3 network standard as employed by Broadcom Inc.'s BCM5400 100/1000BASE-T Gigabit Ethernet Transceiver, in which case the communication module may provide status signals indicating the progress of the auto-negotiation process.

A high-speed communications device may comprise a number of communication modules with each module generating its own status signals. The format of the status signals may vary in characteristics dependent on the nature of a variable value encoded within the status signal. For example, some of the signals may be binary in nature, indicating either total failure or normal operation, while other signals may encode quantitative information, such as number of communication errors per unit of time.

Each communication module may generate its own status signals indicating that the communication module is functioning normally independently of a communication module that may be experiencing processing errors. In this case, monitoring a single status signal or a set of status signals from a communication module may not indicate the quality of the communication link established by the high-speed communications device.

Therefore, a need exists for a method for generating a high-speed communication system performance signal incorporating a variety of communication status signals. The present invention meets such need.

SUMMARY OF THE INVENTION

In one aspect of the current invention, an apparatus comprising a quality indicator logic module receives a set of communication status signals from a transceiver in a high-speed communications network. The quality indicator logic module generates a link quality indicator signal based on the set of communication status signals.

In another aspect of the current invention, the link quality indicator signal is used to drive a Light Emitting Diode (LED) creating a visual display.

In another aspect of the invention, a quality indicator process is provided for generating a link quality indicator signal using an auto-negotiation status signal, a link status signal, a local receiver status signal, a receive error status signal, and a MSE communication status signal.

At reset, the quality indicator process generates a link quality indicator signal at a first signal level.

The quality indicator process then sets the link quality indicator signal to a second signal level if the auto-negotiation complete status signal indicates a local transceiver auto-negotiation process is complete. If the auto-negotiation process is not complete, the quality indicator process sets the link quality indicator signal to the first signal level and continues processing by checking the auto-negotiation complete status signal again.

The quality indicator process checks the link status signal and returns to checking the auto-negotiation complete status signal if the link status signal indicates that a network channel has not been established.

The quality indicator process checks the local receiver communication status signal and sets the link quality indicator signal at the first signal level and continues checking the link status if a local receiver status signal indicates that the local transceiver is not functional.

The quality indicator process then sets the link quality indicator signal at the second signal level if the local receiver status signal indicates that the local transceiver is functional.

The quality indicator process then sets the link quality indicator signal at the first signal level for a first period of time and then sets the link quality indicator signal at the second signal level for the same period of time if a receive error status signal indicates that the local transceiver has a reception error.

The quality indicator process sets the link quality indicator signal at the first signal level for a second period of time and sets the link quality indicator signal at the second signal level for the same period of time if the MSE status signal indicates that a MSE of the local transceiver exceeds a SNR threshold status signal level.

The quality indicator process repeats the process starting with checking the link status signal.

BRIEF DESCRIPTION OF THE DRAWINGS

These and other features, aspects, and advantages of the present invention will become better understood with regard to the following description and accompanying drawings wherein.

DETAILED DESCRIPTION OF THE INVENTION

Figure 1:
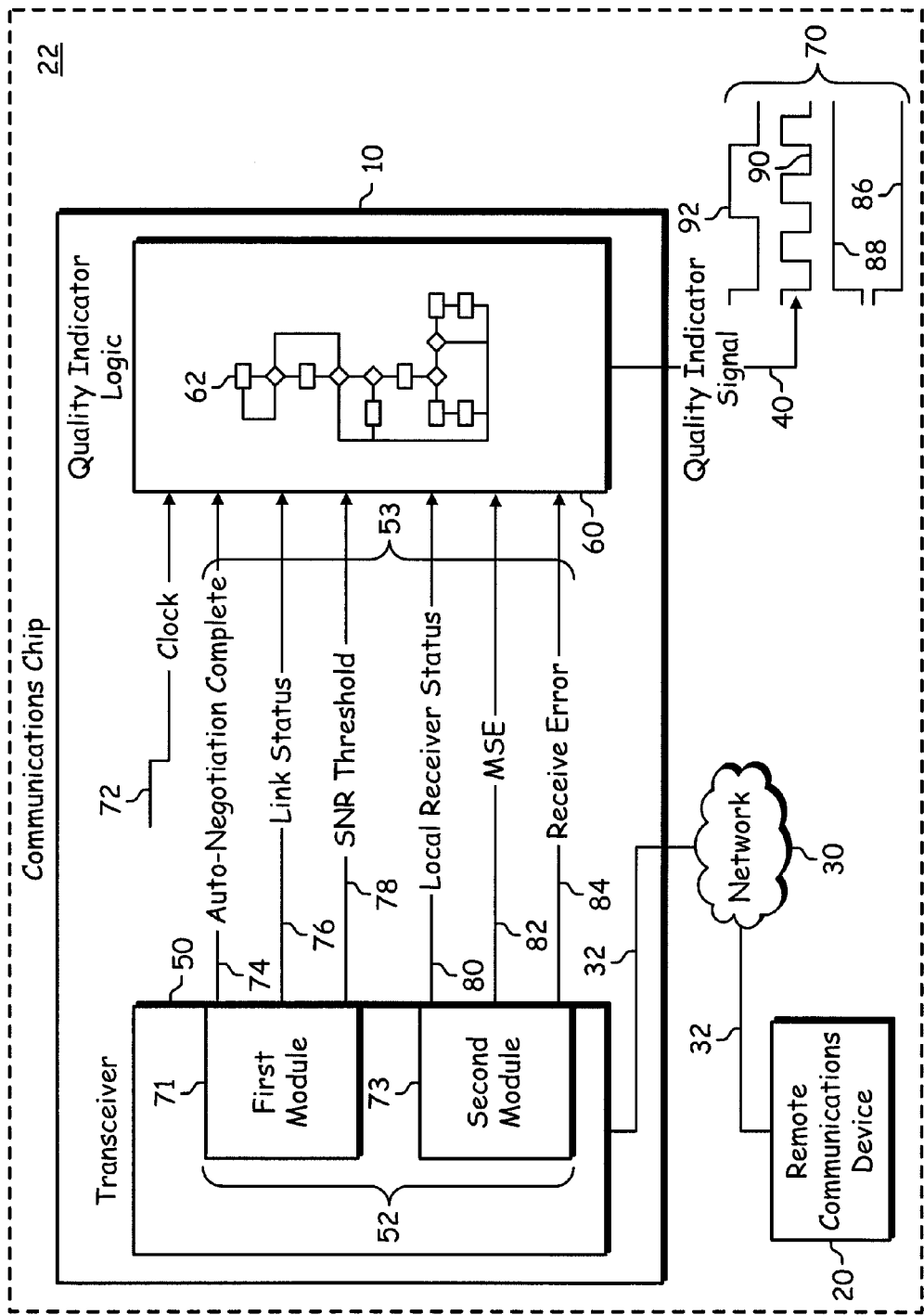
FIG. 1 is a block diagram depicting an embodiment of a performance indicator according to the present invention.

FIG. 1 is a block diagram depicting an embodiment of a performance indicator according to the present invention. A local network chip 10 is operably coupled through a computer network 30 to a remote network device 20 resulting in a high speed communication system 22. The local network chip and the remote network device communicate with each other over the network using the known IEEE 802.3 networking standard creating a network channel 32 through the network. A single performance indicator signal, herein termed a link quality indicator signal, 40 is generated by the local network chip to indicate the quality of the network channel. In operation, the local network chip monitors the quality of the network channel and changes the level of the link quality indicator signal based on the quality of the network channel.

The local network chip includes a local transceiver 50 operably coupled via a plurality of network channel status signals 53 to a quality indicator logic module 60. The quality indicator logic module includes an encoded process 62 for receiving the plurality of network channel status signals transmitted by the local transceiver and processing the plurality of received network channel status signals to generate a single link quality indicator signal. The quality indicator logic module 60 generates a link quality indicator signal including a plurality of possible timing sequences 70. Each of the timing sequences encodes a different aspect of the quality of the network channel.

In one embodiment of a link quality indicator according to the present invention, aperiodic link quality indicator signals are generated to indicate either that the network link is fully operational or that the network link has completely failed.

In another embodiment of a link quality indicator according to the present invention, a plurality of periodic link quality indicator signals are generated with the period of the generated link quality indicator signal indicating a different problem within the local network chip's communication modules.

The local transceiver includes a plurality of operably coupled communication modules 52 that generate and control signals used to establish the network channel. The communication modules generate status signals including the plurality of network channel status signals transmitted by the local transceiver to the quality indicator logic module. These network channel status signals are generated according to the known IEEE 802.3 networking standard. The network channel status signals may or may not share the same format. For example, some of the signals may be binary in nature, indicating either total failure or normal operation, while other signals may encode quantitative information, such as number of errors per unit of time.

In an embodiment of a local network chip according to the present invention, the local transceiver includes communication modules 52. The communication modules include higher level logic for controlling the transceiver operations as well as signal processing circuitry and signal processing logic responsive to the higher level logic (for example, the PHY module) for controlling the operations of the signal processing circuitry.

The communication modules further include logic for auto-negotiation of a master/slave relationship according to the IEEE 802.3 standard. The communication modules generate an auto-negotiation complete signal 76 (for example, the flp_link_good signal as defined in the IEEE 802.3 standard) indicating that the communication modules have completed an attempted auto-negotiation with the remote network device according to the IEEE 802.3 standard.

Even though the auto-negotiation sequence is completed, the link may not have been established. The communication modules include logic for generating a link status signal 76 according to the IEEE 802.3 networking standard at the end of the auto-negotiation sequence indicating whether or not a network link has been properly established.

The communication modules further include logic for generating a Signal to Noise Ratio (SNR) threshold value signal 78 that correlates with the a maximum Bit Error Rate (BER) as provided for in the IEEE 802.3 networking standard. The SNR threshold is programmable by an external control program (not shown) thus facilitating the integration of the local network chip in a larger network device.

In an embodiment of a quality indicator according to the present invention, the SNR threshold is set slightly higher than the SNR threshold called for in the IEEE 802.3 networking standard.

The communication modules generate a local receiver status signal 80 as provided for in the IEEE 802.3 networking standard. The local receiver status signal depends on a SNR as determined by the signal processing circuitry and on the state of a descrambler circuit included in the signal processing circuitry. If the SNR is low and the descrambler circuit can no longer decode the received signals, the signal processing logic sets the local receiver status signal to indicate that data can no longer be sent reliably over the network channel.

The communication modules further include control logic for generating a MSE signal 82 proportional to the Mean Square Error (MSE) produced by the signal processing circuitry. The MSE signal correlates with the SNR of the signal processing circuitry.

The s communication modules further include control logic for generating a receive error signal 84. The receive error signal is a combination of a false carrier sense signal as provided for in the IEEE 802.3 networking standard and a receive coding error as provided for in the IEEE 802.3 networking standard. The false carrier sense signal indicates if the local transceiver receives a frame that does not conform to the IEEE 802.3 networking standard. The receive coding error signal indicates if a frame contains a packet with an error such as a premature packet end as provided for in the IEEE 802.3 networking standard.

The quality indicator logic receives a clocking signal 72 from the local network chip's timing circuit. The clocking signal is used to provide timing information for the quality indicator logic module to generate a plurality of link quality indicator signals with various timing characteristics.

The quality indicator logic module receives the previously described network channel status signals and generates a single link quality indicator signal including a plurality of possible timing sequences 70. Each of the timing sequences encodes a different aspect of the quality of the network channel.

If the quality indicator logic module determines that the network link is functioning normally, the link quality indicator signal is driven low and remains low as long as the network link is functioning normally 86. This creates a first aperiodic link quality indicator signal indicating that the network link is fully operational.

If the local network chip is unable to establish and maintain a network channel with the remote network device, then the link quality indicator signal is driven high 88 and it remains in that state until the local network chip can reestablish the network channel. This creates a second aperiodic link quality indicator signal indicating that the network link is not operational at all.

If the local network chip detects a false carrier sense signal or a receive coding error signal, the link quality indicator signal is driven high then low at a low frequency 92. This creates a first periodic link quality indicator signal indicating that the network link is marginally operational because there are framing or receive coding errors.

If the local network chip detects that the MSE is greater than the SNR threshold value, then the link quality indicator signal is driven high then low at a high frequency 92. This creates a second periodic link quality indicator signal indicating that the network link is marginally operational because the MSE is higher than the SNR threshold value.

Figure 2:
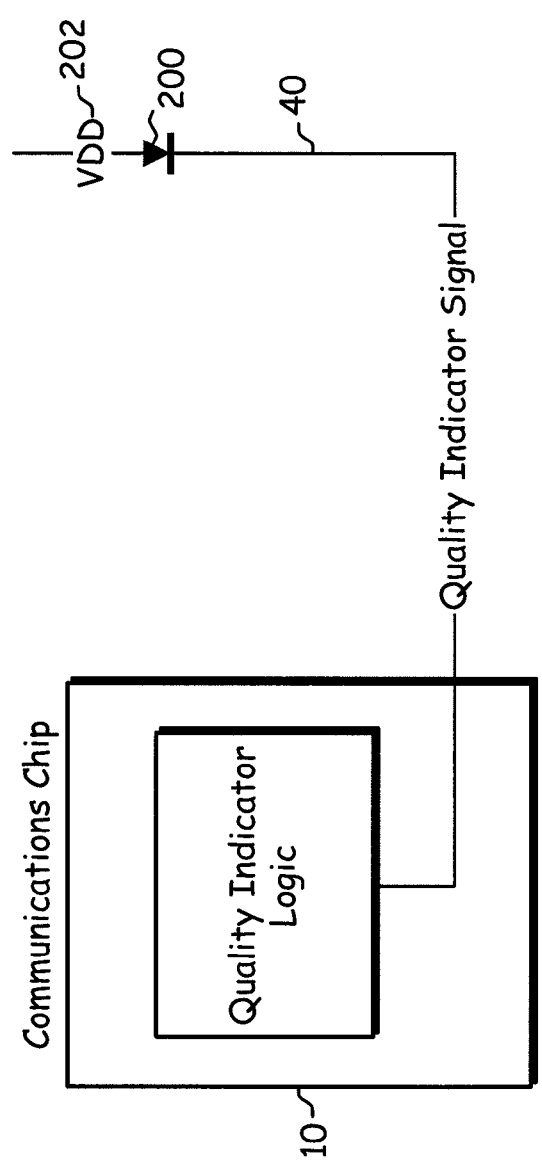
FIG. 2 is a block diagram depicting an LED embodiment of a performance indicator according to the present invention.

FIG. 2 is a block diagram depicting a embodiment of a quality indicator employing a Light Emitting Diode (LED) to generate a visual quality indicator according to the present invention. A quality indicator LED 200 is operably coupled to a previously described link quality indicator signal 40 and a voltage source 202. The link quality indicator signal is driven low and the LED is energized as soon as auto-negotiation is complete and the local network chip 10 is attempting to establish a network channel 32 (FIG. 1). After a network channel is established, the quality indicator LED will remain energized while the network channel is operating reliably with a good SNR.

The link quality indicator signal will be driven high and the quality indicator LED will no longer be energized when the local network chip receive error signal indicates a problem with the communication channel and the local network chip is unable to receive packet data. The quality indicator LED will blink with a varying frequency to indicate intermediate levels of reliability of the network channel.

The following table summarizes the operation of the quality indicator LED:

| LINK QUALITY | QUALITY INDICATOR LED STATUS |
| --- | --- |
| Auto-negotiation in progress | OFF |
| Auto-negotiation complete, establishing network channel | ON |
| Network channel established, high SNR | ON |
| Low SNR -close to data error | Fast blink |
| Receive bit errors detected | Slow blink |
| Local receiver failure | OFF |

Figure 3:
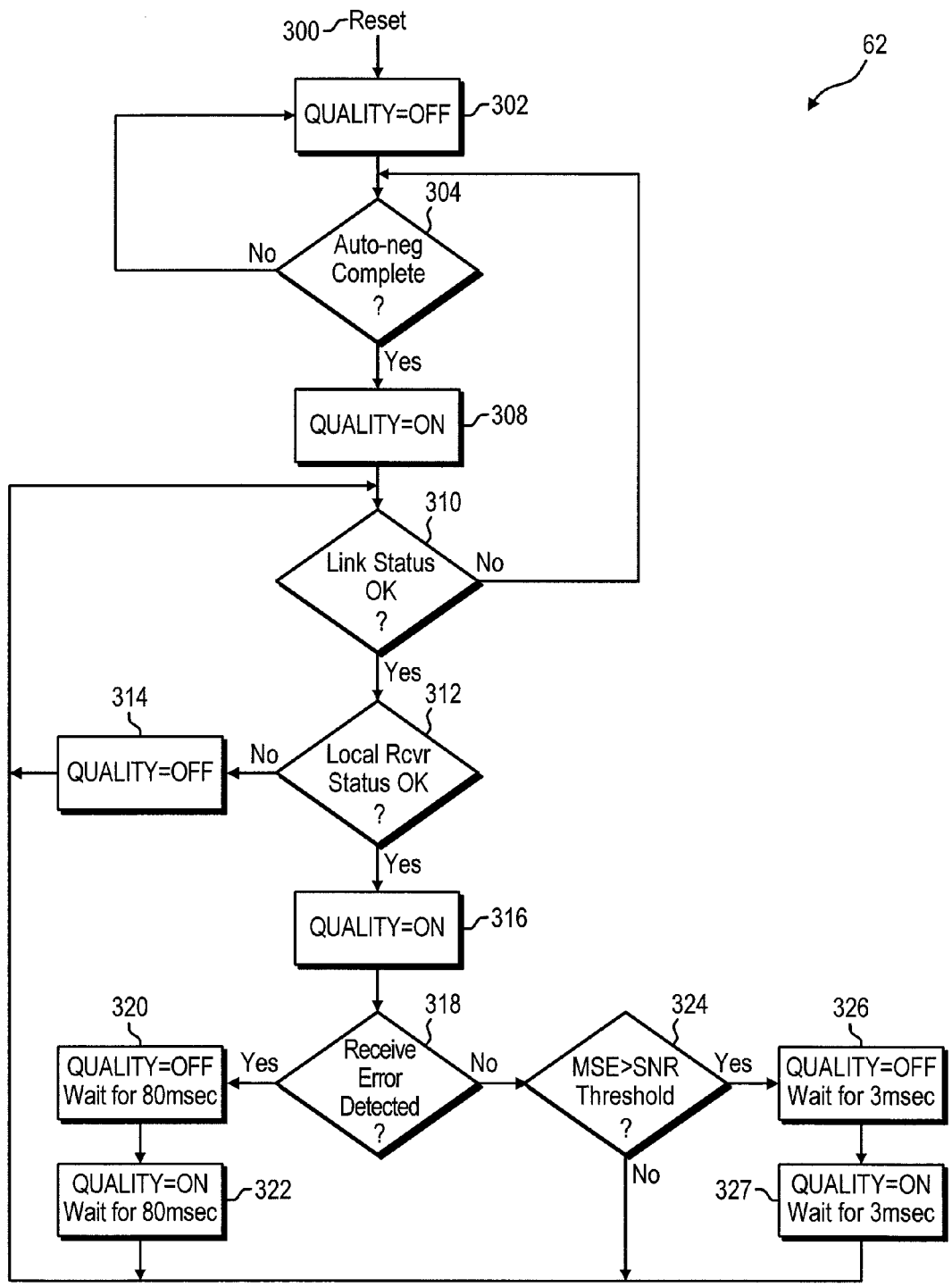
FIG. 3 is a process flow diagram of an embodiment of a performance indicator according to the present invention.

FIG. 3 is a process flow diagram of quality indicator process of an embodiment of a performance indicator according to the present invention. A quality indicator logic module 60 (FIG. 1) includes an encoded quality indicator process 62 for receiving a plurality of network channel status signals 53 (FIG. 1) transmitted by a local transceiver 50 (FIG. 1) and processing the plurality of received network channel status signals to produce a single link quality indicator signal 40 (FIG. 2) used to drive a link quality indicator LED 200 (FIG. 2).

At reset 300, the quality indicator process turns a link quality indicator LED 200 (FIG. 2) off 302. The quality indicator process checks a auto-negotiation complete status signal 74 (FIG. 1) and loops back to reset the link quality indicator LED to off if the auto-negotiation complete signal indicates that the auto-negotiation process has not been completed.

If the auto-negotiation complete status signal indicates that the auto-negotiation process is complete, then the quality indicator process turns the link quality indicator LED on 308.

The quality indicator process checks 310 a link status signal 76 (FIG. 1) and returns to check the auto-negotiation complete status signal 304 if the link status signal indicates that the communication channel is no longer established. If the auto-negotiation complete status signal indicates that the auto-negotiation process is not complete, the quality indicator process turns the link quality indicator LED off 302 and continues monitoring the auto-negotiation complete status signal as previously described waiting for the auto-negotiation complete status signal to indicate that the auto-negotiation process is complete.

If the quality indicator process confirms that the communication channel is open 310, the quality indicator process checks to see of a local receiver status 80 (FIG. 1) indicates that data can no longer be sent reliably over the network channel. If data can no longer be sent reliably over the network channel, the quality indicator process turns the link quality indicator LED off 314 and returns to monitoring the link status signal 310 as previously described.

If local receive status signal indicates that data is being reliably sent over the network channel, the quality indicator process turns the link quality indicator LED on 316 and checks a receive error status signal 84 (FIG. 1) to confirm that there are no framing or receive coding errors as provided for in the IEEE 802.3 networking standard.

If the receive error status signal indicates that there are no framing or receive coding errors, the quality indicator process turns the link quality indicator LED off for a first period of time 320 and then back on 322 for the first period of time. The quality indicator process continues processing by returning to checking the link status signal 310.

In one embodiment of a quality indicator process according to the present invention, the link quality indicator LED is turned OFF for a period of 80 msec and back on for a period of 80 msec in order to cause the link quality indicator LED to blink at a low frequency if the auto-negotiation is complete and the network link is established but there are framing or receive coding errors.

In another embodiment of a quality indicator process according to the present invention, the on and off periods of the LED are different creating a periodic signal with asymmetric on and off periods.

If the receive error signal indicates that there are no framing or receive coding errors as provided for in the IEEE 802.3 networking standard, the quality indicator process checks a previously described MSE signal 82 (FIG. 1) by comparing 324 the MSE signal to a previously described SNR threshold signal 78 (FIG. 1). If the MSE signal is less than or equal to the SNR threshold signal, the quality indicator process continues processing by checking 310 the link status signal as previously described.

If the MSE signal is greater than the SNR threshold signal, the quality indicator process turns the link quality indicator LED off for a second period of time 326 and then back on 327 for the same period of time. The quality indicator-process continues processing by returning to checking the link status signal 310.

In one embodiment of a quality indicator process according to the present invention, the link quality indicator LED is turned OFF for a period of 3 msec and back on for a period of 3 msec in order to cause the link quality indicator LED to blink at a high frequency.

In another embodiment of a quality indicator process according to the present invention, the on and off periods of the LED are different creating a periodic signal with asymmetric on and off periods.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claim's equivalents rather than the foregoing description.

What is claimed is:

1. A method of providing a link quality indicator signal for a communication system having a local transceiver, the method comprising:

receiving a plurality of communication status signals from the transceiver;

generating a first aperiodic link quality indicator signal if a first subset of the plurality of communication status signals indicates an operational network channel; and generating a second aperiodic link quality indicator signal if the first subset of the plurality of communication status signals indicate an inoperative network channel.

2. The method of claim 1, the generation of a link quality indicator further including:

generating a periodic link quality indicator signal if a second subset of the plurality of communication status signals indicates a marginally operational network channel.

3. The method of claim 2, wherein generating a periodic link quality indicator signal further includes determining a period of the periodic link quality indicator signal based on the second subset of the plurality of communication status signals.

4. The method of claim 2, wherein generating a periodic link quality indicator signal further includes generating a periodic link quality indicator signal with asymmetric high and low periods.

5. An apparatus for generating a link quality indicator signal for a communication system having a local transceiver, the apparatus comprising:

a quality indicator signal generator including quality indicator logic operable to receive a set of communication status signals from the local transceiver, the quality indicator logic being operable to generate a first aperiodic link quality indicator signal if a first subset of the set of communication status signals indicates an operational network channel, the quality indicator logic being further operable to generate a second aperiodic link quality indicator signal if the first subset of the set of communication status signals indicates an inoperative network channel.

6. The apparatus of claim 5, further comprising a light emitting diode operably coupled to the link quality signal generator.

7. The apparatus of claim 5, the quality indicator logic being operable to generate a periodic link quality indicator signal if a second subset of the set of communication status signals indicates a marginally operational network channel.

8. The apparatus of claim 7, wherein the quality indicator logic is operable to determine a period of the periodic link quality indicator signal based on the second subset of the plurality of communication status signals.

9. The apparatus of claim 7, wherein the quality indicator logic is operable to generate a periodic link quality indicator signal with asymmetric high and low periods.

* * * * *

UNITED STATES PATENT AND TRADEMARK OFFICE
CERTIFICATE OF CORRECTION

| | | |
|---|---|---|
| PATENT NO. | : 7,668,108 B2 | Page 1 of 1 |
| APPLICATION NO. | : 11/332937 | |
| DATED | : February 23, 2010 | |
| INVENTOR(S) | : Castellano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Seventh Day of December, 2010

David J. Kappos
*Director of the United States Patent and Trademark Office*